US006219589B1

(12) United States Patent
Faraz et al.

(10) Patent No.: US 6,219,589 B1
(45) Date of Patent: Apr. 17, 2001

(54) REMOTE MANIPULATOR WITH FORCE FEEDBACK AND CONTROL

(75) Inventors: Ali Faraz, Coquitlam; Shahram Payandeh, Port Moody, both of (CA)

(73) Assignee: Simon Fraser University, Burnaby (CA)

( * ) Notice: Subject to any disclaimer, the term of this patent is extended or adjusted under 35 U.S.C. 154(b) by 0 days.

(21) Appl. No.: 09/176,978

(22) Filed: Oct. 22, 1998

Related U.S. Application Data

(60) Provisional application No. 60/062,987, filed on Oct. 22, 1997.

(51) Int. Cl.[7] .............................. G05B 19/04; G05B 19/18
(52) U.S. Cl. .......................... 700/254; 700/257; 700/262; 700/264; 345/130; 345/161; 345/163; 600/130; 414/4; 74/490.01
(58) Field of Search .............................. 700/254, 85, 257, 700/262, 264; 703/6; 74/490.01; 345/163, 161, 157, 156, 145, 167; 709/203, 217, 230; 318/568.11, 568.1, 628; 600/595, 130; 414/4

(56) References Cited

U.S. PATENT DOCUMENTS

| | | | |
|---|---|---|---|
| 3,923,166 | * 12/1975 | Fletcher et al. | 414/4 |
| 5,397,323 | * 3/1995 | Taylor et al. | 606/130 |
| 5,464,197 | 11/1995 | Ecclesfield | 267/155 |
| 5,623,582 | 4/1997 | Rosenberg | 700/264 |
| 5,625,576 | * 4/1997 | Massie et al. | 703/6 |
| 5,709,219 | * 1/1998 | Chen et al. | 600/595 |
| 5,731,804 | * 3/1998 | Rosenberg | 345/156 |
| 5,898,599 | * 3/1999 | Massie et al. | 345/161 |
| 6,057,828 | * 5/2000 | Rosenberg et al. | 345/156 |

FOREIGN PATENT DOCUMENTS

WO 18925 * 4/1992 (EP).

OTHER PUBLICATIONS

Kazerooni et al., The Dynamics and Control of a Haptic Interface Device, IEEE., pp. 453–464, 1994.*
Rosenberg et al., Percptual Eecomposition of Virtual Haptic Surface, IEEE., pp. 46–53, 1993.*
Koehn et al., Toward Evaluation of Shape Memory Alloy Actuators for Endosurgery, IEEE., pp. 1991–1996.*
Payandeh et al., Toward Design of a Modular Laparoscopic Assistant Stand (MLAS), IEEE., pp. 208–209, 1997.*
Hiemenz et al., A Physiologically Valid Simulator for Training Residents to Perform an Epidural Block, IEEE., pp. 170–173, 1996.*
Loly et al., Imposing Motion Constraints to a Force Reflecting Telerobot through Reall–Time Simulation of a Virtual Mechanism, IEEE., pp. 357–362, 1995.*
Reznik et al., Dynamic Simulation and Virtual Control of a Dformable Fingertip, IEEE., pp. 1669–1674, 1996.*

(List continued on next page.)

Primary Examiner—William A. Cuchlinski, Jr.
Assistant Examiner—McDieunel Marc
(74) Attorney, Agent, or Firm—Oyen Wiggs Green & Mutala

(57) ABSTRACT

A haptic interface for a remote manipulator uses a tunable spring to provide force reflection. The remote manipulator has an operating member coupled to the tunable spring. The operating member is also coupled to a manipulator member. A controller monitors the force with which an operator so moves the operating member and varies a spring constant of the tunable spring to keep the force exerted by the manipulator member on an object at a desired level. The haptic interface allows simultaneous control over the maximum force exerted by the manipulator member as well as the transmission ratio between the operating member and the manipulator member. The remote manipulator may be a surgical grasper, for example. A tunable spring can be smaller and lighter than the high torque actuators used in some prior remote manipulators which provide force feedback.

15 Claims, 7 Drawing Sheets

OTHER PUBLICATIONS

Morita et al., Design and Development of a new Robot Joint, IEEE., pp. 2469–2475, 1995.*

Forkey et al., A Comparison of Thumb And Forearm Muscle Effort Required For Laparoscopic And Open Surgery Using An Ergonomic Measurement Station, IEEE., pp. 17051708, 1997.*

Rosen et al., Force Controlled and Teleoperated Endoscopic Grasper For Minimally Invasive Surgery–Experimental Performance Evaluation, IEEE., pp. 1212–1221, 1999.*

Ali et al., Design of Haptic Interface throuth Stiffness Modulation for Endosurgery: Theory and Experiments, IEEE., pp. 1007–1012, 1998.*

Kirsten F. Laurin–Kovitz; J. Edward Colgate; Steven D.R. Carnes, Design of Components for Programmable Passive Impedance, Apr. 1991.

Anirban De and Uri Tasch, Modulating the End–Point Compliance of a Two DOF Manipulator to its Full Rank: Theory and Hardware Implementation, 1994.

Anirban De and Uri Tasch, A Two–DOF Manipulator with Adjustable Compliance Capabilities and Comparison with the Human Finger, Jun. 6, 1995.

* cited by examiner

REMOTE MANIPULATOR WITH FORCE FEEDBACK AND CONTROL

CROSS REFERENCE TO RELATED APPLICATION

This application claims the benefit of provisional application serial No. 60/062,987 filed Oct. 22 1997 and entitled HAPTIC INTERFACE THROUGH TUNABLE SPRINGS.

FIELD OF THE INVENTION

This invention relates to remote manipulators which provide force-feedback to a user. The invention has application, for example, in graspers which may be used in surgery or used for the remote manipulation of delicate parts.

BACKGROUND OF THE INVENTION

Remote manipulators are used in a wide variety of applications. One of the most demanding applications for remote graspers is in surgery. The use of remote manipulators in surgery is becoming increasingly important. For example, various surgical operations can now be performed laparoscopic,ally through the use of appropriate laparoscopic graspers. These surgical procedures would be impossible without elongated graspers which can act as extensions of the surgeon's hand for remote manipulations at locations inside a patient's body.

A laparoscopic grasper typically comprises a lever which can be moved by a surgeon. The lever is typically mounted adjacent to a fixed handle so that the surgeon can control the lever with one hand by squeezing the lever toward the handle. The lever is connected to the jaws of a grasper by a mechanical linkage. Typically the linkage comprises a number of links which are connected to provide a ratio of lever movement to grasper movement (or "transmission ratio") which is less than 1:1.

One problem with such graspers is that they do not provide the surgeon with very good force feedback. The surgeon often cannot tell how tightly the grasper is gripping an object because the transmission ratio of the linkage is not 1:1. Furthermore, friction is inherent in the mechanical linkage. Free play which generally occurs in the joints of any mechanical linkage also deleteriously affects the force feedback to a surgeon. These problems are compounded because the ratio of the force being applied to the handle by the surgeon to the force being applied to the grasper tends to vary significantly with the mechanical properties of the object being grasped as well as with the degree of opening of the grasper. As a result, of these factors, surgeons have less control over the forces exerted by remote graspers than is desirable. There have been a number of injuries to patients undergoing laparoscopic surgical procedures. Some of these injuries can be attributed, at least in part, to the lack of accurate force feedback in currently used laparoscopic graspers.

Various attempts have been made to design mechanical remote graspers which have low friction losses and have force transmission functions which are nearly constant. Such designs yield improvements in some areas. These designs are still not optimal because they do not allow the force transmission function to be easily adjusted. Preferably the force transmission function can be adjusted so that the forces exerted at the handle to yield a desired range of forces at the grasper lie in the range where the surgeon's hand has the greatest force sensitivity. Another problem with such mechanical graspers is that they provide no mechanism for limiting the maximum force that can be applied by a grasper.

Others have provided systems for operating a remote grasper completely under computed closed loop feedback control. Such systems are often very complex and suffer from the additional disadvantage that the systems fail completely if their computer controllers malfunction. Further, such systems often use bulky and/or very expensive actuators to drive the motion of the grasper. Two examples of such systems are U.S. Pat. Nos. 5,623,582 Rosenberg and 5,625,576 Massie et al.

Remote manipulators have many applications other than surgery. For example, remote manipulators may be used to manipulate hazardous materials or to service parts of machinery which cannot be reached with a human hand. Many of these applications also require a remote manipulator which provides force feedback to a user, adjustable force transmission function and a mechanism for preventing excessive forces from being applied to the output portion of the remote manipulator.

There is a continuing need for a remote grasper in which the maximum amount of output force can be limited. There is also a continuing need for remote manipulators which provide adjustable force transmission functions. There is a particular need for such remote manipulators which are compact, light in weight, and simple in construction.

SUMMARY OF THE INVENTION

This invention provides a remote manipulator having a "force feedback" or "haptic" user interface. The remote manipulator can provide an adjustable force transmission function, a limited maximum output force, or both. Preferred embodiments of the invention provide both an adjustable force transmission function and a limited maximum output force.

Accordingly, a first aspect of the invention provides a remote manipulator comprising: a manipulable operating member pivotally movable about a pivot axis; a manipulator member coupled to the operating member by a linkage, the linkage causing the manipulator member to move in response to movements of the operating member; a tunable spring having a variable spring constant, the tunable spring coupled between a connection point spaced apart from the pivot axis on the manipulator member and a mount; a force sensor coupled to the operating member, the force sensor producing a signal representing a force applied to the operating member; and, a control circuit connected to receive the signal and to vary the spring constant of the tunable spring in response to the signal, The tunable spring preferably comprises a leaf spring. Most preferably the tunable spring comprises a resilient leaf supported by two spaced apart supports which cause the portions of the leaf supported by the supports to have a constant deflection.

Preferably the remote manipulator controller comprises: means for comparing the force sensor signal to a threshold value; and, means for increasing the spring constant of the spring if the force sensor signal exceeds the threshold value.

A more general aspect of the invention provides a remote manipulator comprising: an operating member, the operating member movable against a force of a tunable spring coupled to the operating member, the tunable spring having a variable spring constant; a manipulator member; a linkage coupling the operating member and the manipulator member, the linkage causing the manipulator member to move in response to motion of the operating member; a sensor coupled to detect and generate a signal representing a force applied to the operating member; a controller connected to receive the signal; and, an actuator operable by the controller to vary the spring constant.

BRIEF DESCRIPTION OF THE DRAWINGS

In drawings which illustrate embodiments of the invention, but which not be construed so as to limit the invention on in any way.

DETAILED DESCRIPTION

Figure 1:
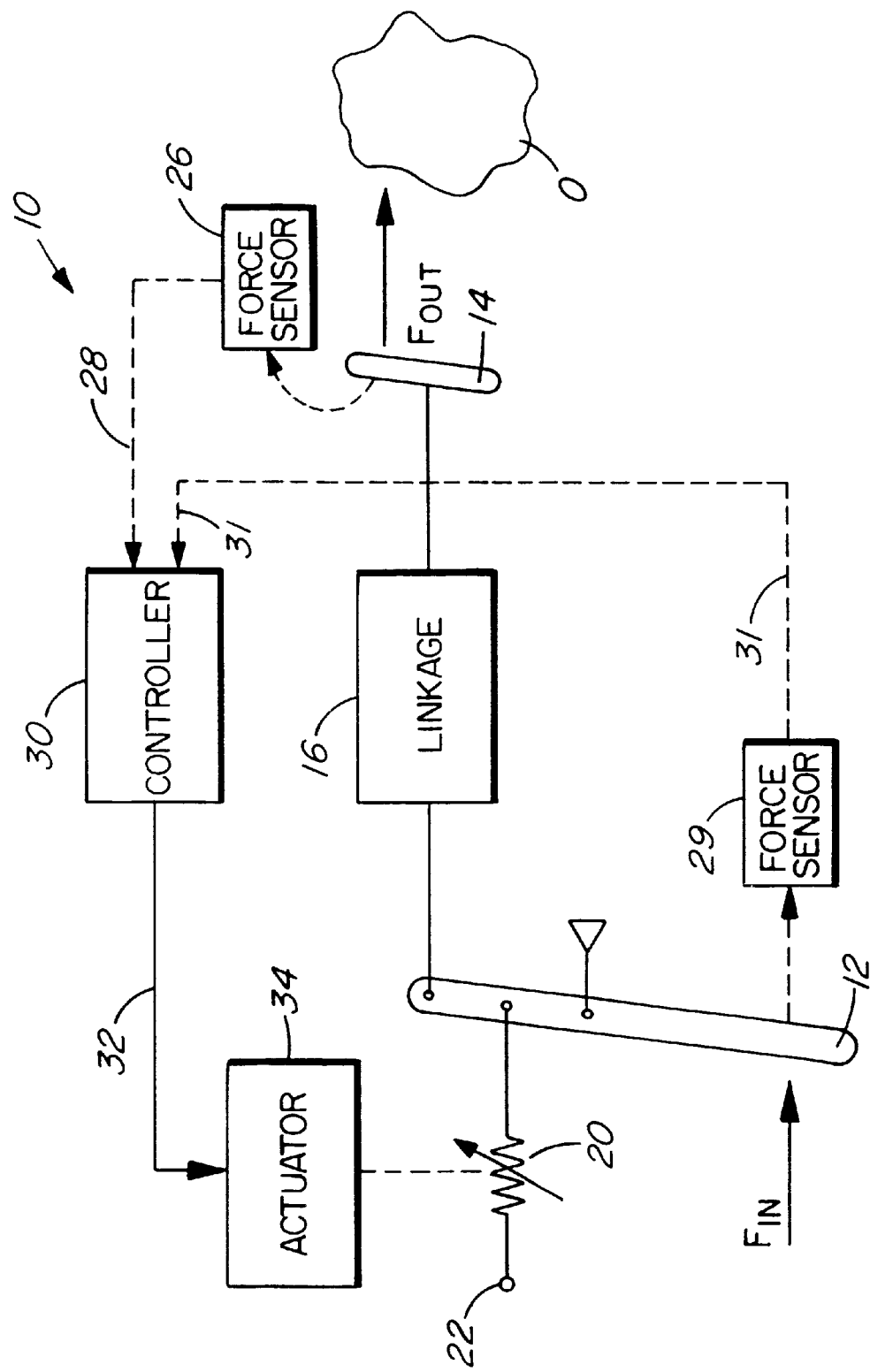
FIG. 1 is a schematic illustration of a generalized remote manipulator according to the invention.

FIG. 1 shows a schematic generalized view of a remote manipulator 10 according to the invention. Remote manipulator 10 has an operating member 12 which can be moved by a human operator or user. The term "operating member" is intended to encompass levers, buttons handles or other members which can be moved by an operator to control a remote manipulator. Operating member 12 is coupled to a manipulator member 14 by a linkage 16. The term "manipulator member" is a general term which encompasses movable members in a remote manipulator which interact with objects in the environment. The pincer remembers on a grasper are one species of manipulator member. A rod which pushes on an object and an arm that bears against an object are other non-limiting examples of manipulator members.

A user can move operating member 12. Linkage 16 causes manipulator member 14 to make corresponding movements. If the motion of manipulator member 14 is blocked by an object O then manipulator member 14 will apply a force to the object. The amount of force applied to the object is determined by the amount of force applied to operating member 12 and the force transmission function of remote manipulator 10.

A tunable spring 20 is coupled between operating member 12 and a support 22. Tunable spring 20 is connected so that a user must move operating member 12 to do work against a force exerted by tunable spring 20 in order to cause manipulator member 14 to apply a force to an object O. Any linkage connecting spring 20 and operating member 12 should either have very little backlash or be pre-loaded so that motions of operating member 12 are transmitted directly to spring 20.

Tunable spring 20 has a spring constant which can be varied. The force, F, exerted by tunable spring 20 is given by the equation:

$$F = K_S x \tag{1}$$

where $K_S$ is the variable spring constant and x is the displacement of tunable spring 20 from a reference position. It can be appreciated that the ratio of the force applied by a user to operating member 12 to the force applied by manipulator member 14 to an object O can be varied by varying the spring constant $K_S$. The force applied by manipulator member 14 to object O can also be limited so that it does not exceed a maximum value $F_{LIM}$ by causing the spring constant $K_S$ to increase to a very large value as the force applied by manipulator member 14 to object O approaches the maximum value $F_{LIM}$.

Remote manipulator 10 includes a sensor 29 which produces an output signal 31 representing the force being applied to operating member 12 by a user. Signal 31 is provided as input to a controller 30. Controller 30, in turn, produces an output signal 32 which controls an actuator 34. Actuator 34 serts the spring constant $K_S$ of tunable spring 20 to an instantaneously desired value, as determined by controller 30, to achieve the desired force transmission to manipulator member 14.

Figure 2:
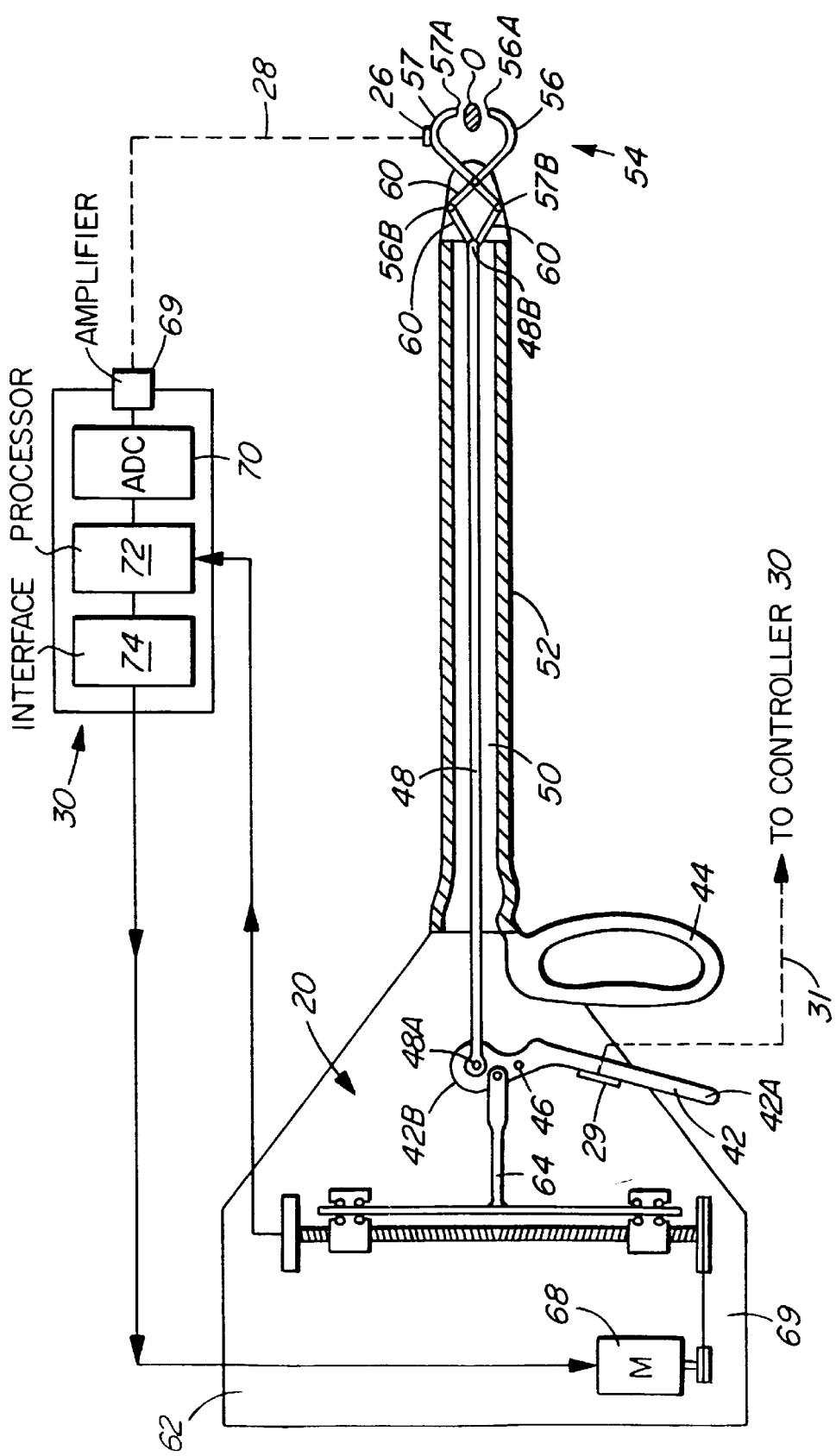
FIG. 2 is a partially schematic view of a prototype remote grasper for use in laparoscopic surgery.

The components of remote manipulator 10 can each be realized in many ways without departing from the broad parameters of the invention. FIG. 2 illustrates a specific embodiment of the invention. The embodiment of FIG. 2 is a prototype remote manipulator 40 for use in laparoscopic surgery. Commercial embodiments of the invention would likely differ in details of implementation.

Remote manipulator 40 comprises an operating lever 42 which is pivotally mounted adjacent a fixed handle 44. A user can squeeze a first end 42A of operating lever 42 toward handle 44 to operate manipulator 40.

Operating lever 42 is pivotally mounted to handle 44 by a pivot pin 46. When a user squeezes end 42A of operating lever 42 toward handle 44, a second end 42B of operating lever 42 pulls on a first; end 48A of a rod 48 which extends through the bore 50 of a tube 52 affixed to handle 44. Rod 48 actuates a pincer 54 at a remote end of tube 52.

Pincer 54 comprises a pair of pincer members 56 and 57 which are pivotally connected by a pivot pin 58 to the remote end of tube 52. Pincer members 56 and 57 have opposed first ends 56A and 57A respectively which can grasp an object O between themselves. Second ends 56B and 57B of pincer members 56 and 57 are each connected to a second end 483 of rod 48 by a link 60.

Figure 4:
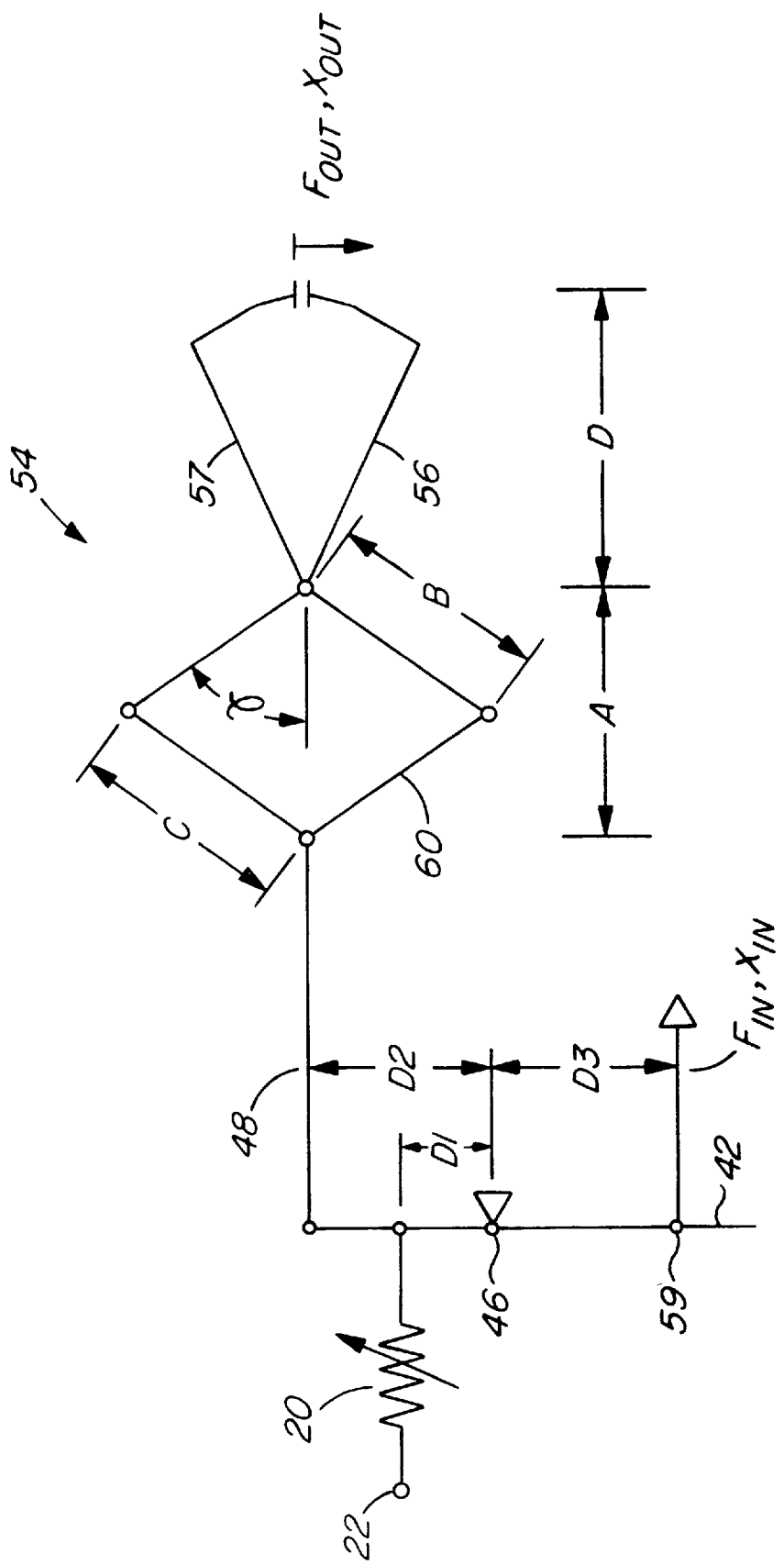
FIG. 4 is a detailed view of the tunable spring of the remote grasper of FIG. 2.

A tunable compression spring 20 is mounted on a mounting plate 62 which is rigidly coupled to handle 44. Spring 20 is coupled to operating lever 42 by a link 64. Spring 20 should be connected to handle 44 in a way which is sufficiently stiff that spring 20 does not move significantly when the force exerted by spring 20 on link 64 changes. Link 64 is pivotally coupled to operating lever 42 at a point 66 which is spaced apart from pivot pin 46 by a distance D (FIG. 4). The spring constant $K_S$ of tunable spring 20 is adjusted by a motor 68.

A force sensor 29 is coupled so as to measure the force $F_{IN}$ applied by an operator to end 42A of operating member 42. Force sensor 29 generates an analog signal 31 which is provided to controller 30 Controller 30 comprises an amplifier 69, an analog to digital converter ("ADC") 70, a processor 72 and an interface 74 which drives motor 68 in response to commands from processor 72.

Preferably a force sensor 26 is also coupled so as to measure the force $F_{OUT}$ being applied to an object O by end 57A of pincer member 57. A signal 28 representative of $F_{OUT}$ is also provided to controller 30 for monitoring and comparison with $F_{IN}$. Force sensors 26 and 29 may comprise strain gauges on pincer member 57 and operating lever 42 respectively.

Figure 3:
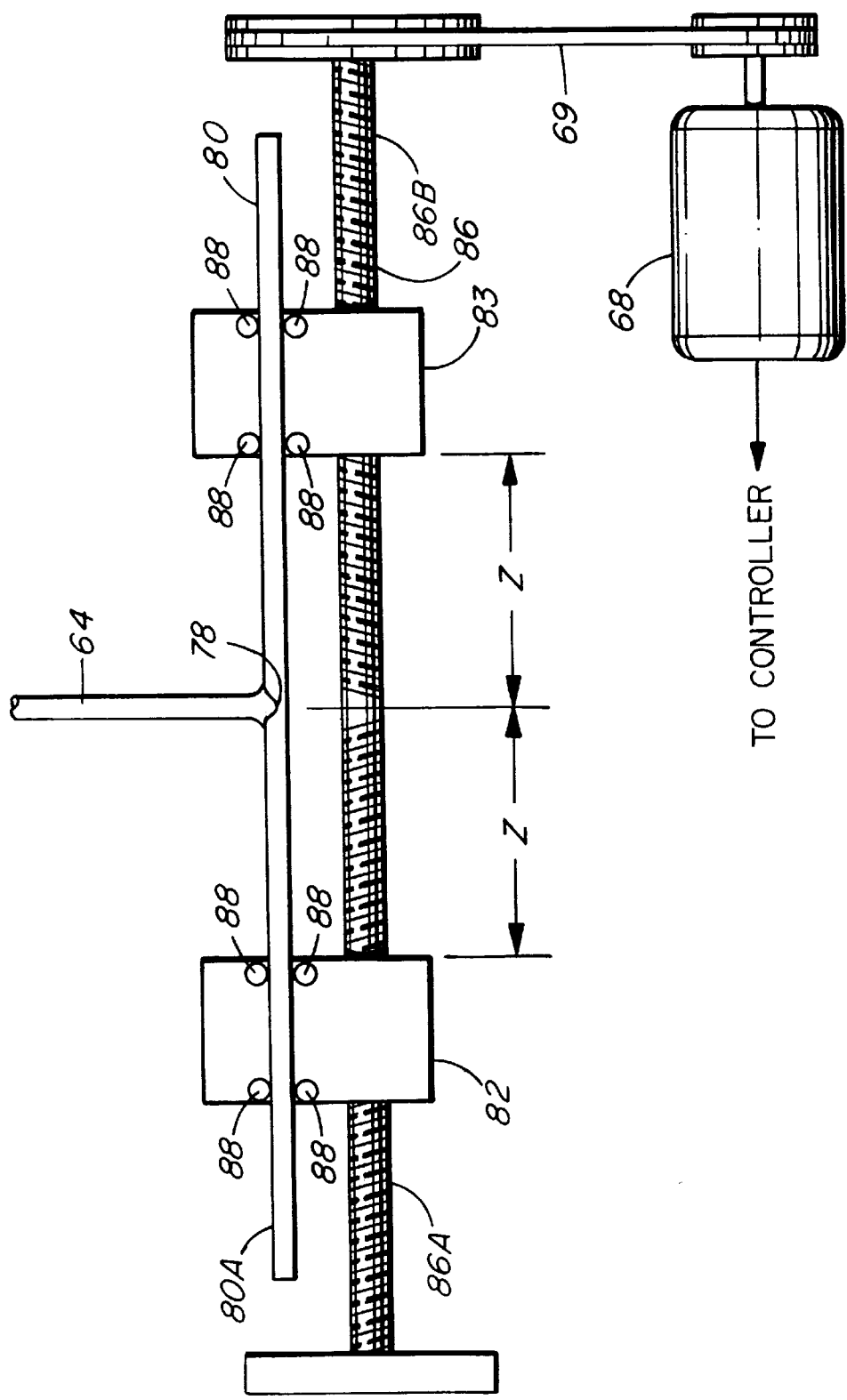
FIG. 3 is a diagrammatic representation of the remote grasp of FIG. 2.

FIG. 3 shows a preferred embodiment of tunable spring 20 which comprises a resilient leaf 80. Link 64 is connected at a midpoint 78 of leaf 80. Leaf 80 is supported on either side of midpoint 78 by supports 82 and 83 which are equally spaced by the distance Z from midpoint 78. Supports 82 and 83 are slidably mounted to base 62.

A threaded rod 86 is driven by motor 68. Motor 68 drives the rotation of threaded rod 86 through a transmission 69. Threaded rod 86 has sections 86A and 86B in which the pitch of the threads are opposite. Support 82 is threadedly engaged with section 86A of rod 86. Support 83 is threadedly engaged with section 86B of rod 86. When motor 68 turns rod 86 in a first sense about its longitudinal axis supports 82 and 83 move toward one another (reducing the distance Z). This increases the spring constant $K_s$. of tunable spring 20. When motor 68 turns rod 68 in a sense opposite to the first sense, supports 82 and 83 move apart. This reduces the spring constant $K_s$ of tunable spring 20.

Each of supports 82 and 83 comprises two closely spaced apart pairs guides 88. One guide 88 in each pair of guides bears against a front face 80A of leaf 80. The second guide 88 in each pair of guides bears against a rear face 80B of leaf 80. Guides 88 cause both the deflection and slope of leaf 80 to be essentially zero at a distance Z on either side of midpoint 78.

FIG. 4 shows a diagrammatic view of remote grasper 40. Moving a point 59 on operating lever through a distance $X_{IN}$ causes the separation of the ends of pincer members 56 and 57 to move through a corresponding distance $X_{OUT}$. Applying a force $F_{IN}$ at point 59 produces a corresponding force $F_{OUT}$ between the ends of pincers 56 and 57.

When tunable spring 20 is not connected to grasper 40, r is given by:

$$r = \frac{X_{IN}}{X_{OUT}} = \frac{F_{OUT}}{F_{IN}} \quad (2)$$

For the embodiment of FIG. 2, r is given by:

$$r = \frac{D3}{D2}\left(\frac{\sqrt{C^2 + 2AB\cos\gamma - B^2} + A}{2D\sin(\gamma - \gamma_0)}\right) \quad (3)$$

where A, B, C and D are dimensions shown in FIG. 4, γ is the angle shown in FIG. 4, and $\gamma_0$ is the value of γ when $X_{IN}$ is equal to zero. In some typical surgical graspers A is about 5 mm, B is about 4 mm, C is about 5 mm, and D is about 32 mm. For typical design parameters of at least some commonly available laparoscopic graspers the function r can be approximated reasonably closely by a linear function. In some currently available surgical graspers r is about 0.19. The invention is, of course, not limited to these, or any, specific dimensions.

$C_0$ is given by:

$$C_0 = \frac{X_{OUT}}{X_{IN}} \quad (4)$$

For the embodiment of FIGS. 2–4, $r_s$ is the ratio of distances D1 and D3.

For the tunable spring 20 of FIG. 3 it can be shown that $K_S$ is given by:

$$K_S = \frac{24EI}{F^3} \quad (5)$$

where E is Young's !modulus, I is the moment of inertia of leaf 80, and Z is the distance between midpoint 78 of leaf 80 and the innermost guides 88 of supports 82 and 83. For a leaf 80 having a rectangular cross section of width b and thickness t, I is given by:

$$I = \frac{bt^3}{12} \quad (6)$$

Controller, 30 controls tunable spring 20 so that $F_{OUT}$ is equal to a desired value $F_{DESIRED}$ which is given by:

$$F_{DESIRED} = \begin{cases} r'F_{IN} & \text{if: } r'F_{IN} \leq F_{LIM} \\ F_{LIM} & \text{if: } r'F_{IN} > F_{LIM} \end{cases} \quad (7)$$

where $F_{LIM}$ is the maximum value desired for $F_{OUT}$ and r' is the desired forte transmission function from operating lever 42 to grasper 54 (when $F_{OUT}$ is not being limited). It can be shown that:

$$r' = \frac{F_{OUT}}{F_{IN}} = \frac{r}{1 + r^2 r_s^2 C_0 K_s} \quad (8)$$

where r is the mechanical transmission function between operating handle 42 and grasper 54, $r_s$ is the transmission function between operating lever 54 and tunable spring 20, $K_S$ is the spring constant of tunable spring 20 and $C_0$ is the compliance of the environment in which grasper 54 is operating.

The above equations can be used to provide a relationship which yields a desired value for Z as a function of a measured input force $F_{IN}$, and a desired value for r'. With some simplifying assumptions one can obtain the relationship:

$$Z = \left(\frac{L}{r\frac{F_{IN}}{F_{OUT}} - 1}\right)^{1/3} \quad (9)$$

where L is a constant give by:

$$L = 24EIr^2r_s^2C_0 \quad (10)$$

The above relationships may be used in controller 30 to control tunable spring 20 so as to cause grasper 40 to operate according to equation (2).

Figure 5:
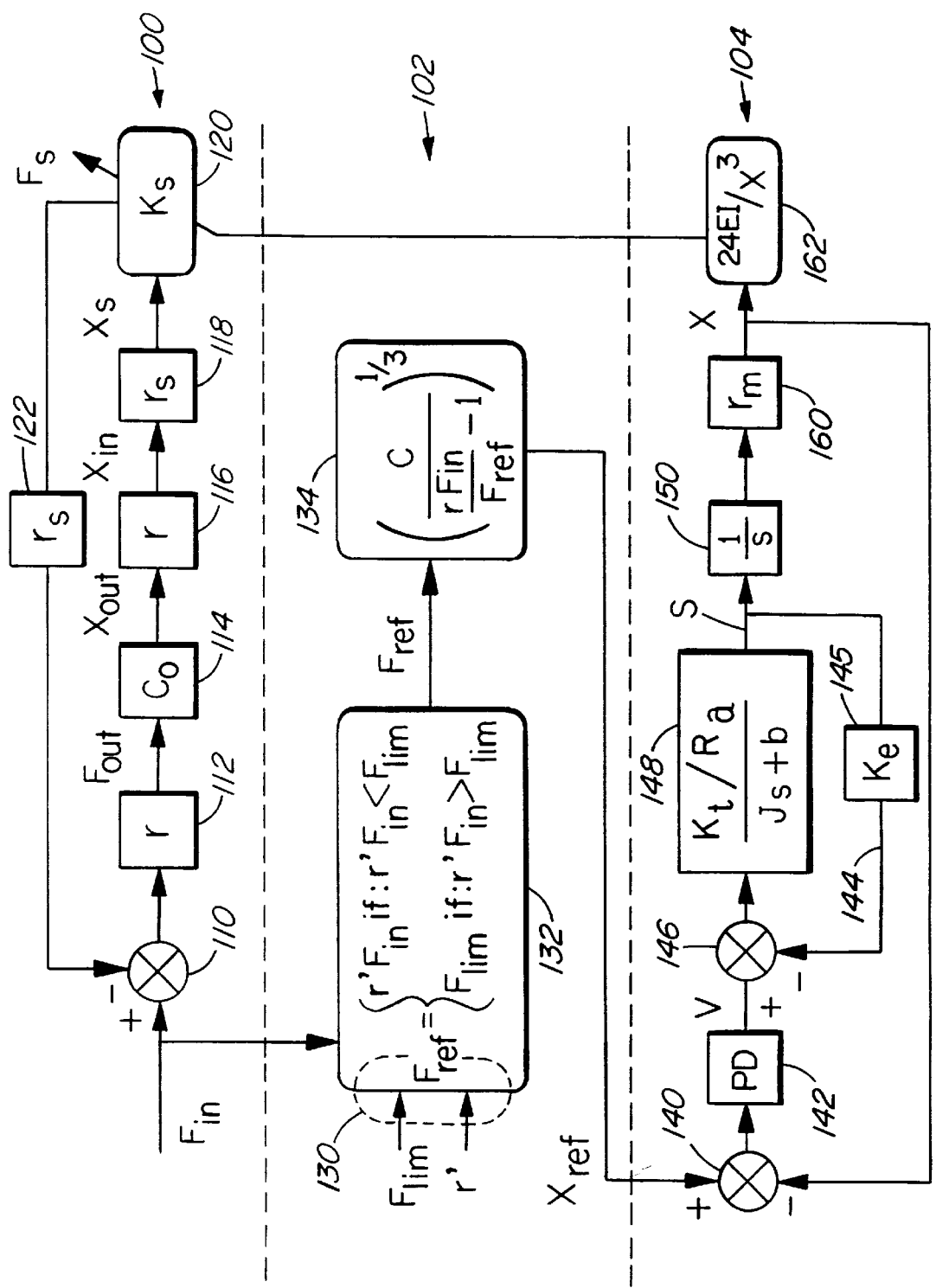
FIG. 5 is a block diagram illustrating the control system of the invention.

FIG. 5 is a block control diagram which provides a functional illustration of a control system for grasper 40. Section 100 represents the mechanical linkages of grasper 40, section 102 represents processes in controller 30 and section 104 represents processes in the actuator which adjusts the spring constant of tunable spring 20.

It can be seen that a user applies a force $F_{IN}$ to operating lever 42 against a force developed by tunable spring 20 as indicated at 110. A net force $F_{IN}$ acts through the linkage of grasper 40, indicated by 112 to produce an output force $F_{OUT}$ between pincer members 56 and 57. The compliance of object O, indicated at 114 determines the displacement $X_{OUT}$ which results from the application of force $F_{OUT}$. The displacement $X_{OUT}$, and the mechanical transmission ratio of grasper 40 in turn, determine the displacement $X_{IN}$ of operating lever 42 as indicated by 116. The displacement $X_S$ of tunable spring 20 is related to the displacement $X_{IN}$ by $r_s$ as indicated at 118 The force $F_S$ exerted by tunable spring 20 is related to $X_S$ by the spring constant $K_S$ as indicated at 120. Finally, the force $F_S$ is applied to operating lever 42 as indicated at 122.

Controller 30 takes as an input a measured value for $F_{IN}$ and a desired value for r' as indicated at 130. Controller 30 then computes a desired value for $F_{OUT}$ according to the rule of equation (2) as indicated at 132. This desired value for $F_{OUT}$ is used to calculate according to equation (9) a desired value for the distance Z which determines the spring constant $K_S$ as indicated at 134.

The desired value for Z is compared to the current value of Z at 140. Any difference between these two values is amplified at 142. The resulting signal is added to a feedback signal 144 at 146 and the result is used to compute a motor driving signal S at 148. The motor driving signal in the exemplary embodiment shown in the drawings is calculated by the formula:

$$S = \frac{K_t}{R_a(Js+M)} \qquad (11)$$

where $K_t$ is the torque constant of motor 68, $R_a$ is the electrical resistance of the armature of motor 68, J is the moment of inertia of the rotor of motor 68, s is the first derivative of the result entering block 148, and M is a damping constant for rotary motion of motor 68. The motor driving signal S is then integrated at 150 and applied through the transmission ratio of transmission 69 to effect a change in Z as indicated at 160. Feedback signal 144 is generated from the motor driving signal at 145 by multiplying by $K_a$, the electric constant of motor 68. The change in Z results in a change in $K_S$ as indicated by 162.

Figure 7:
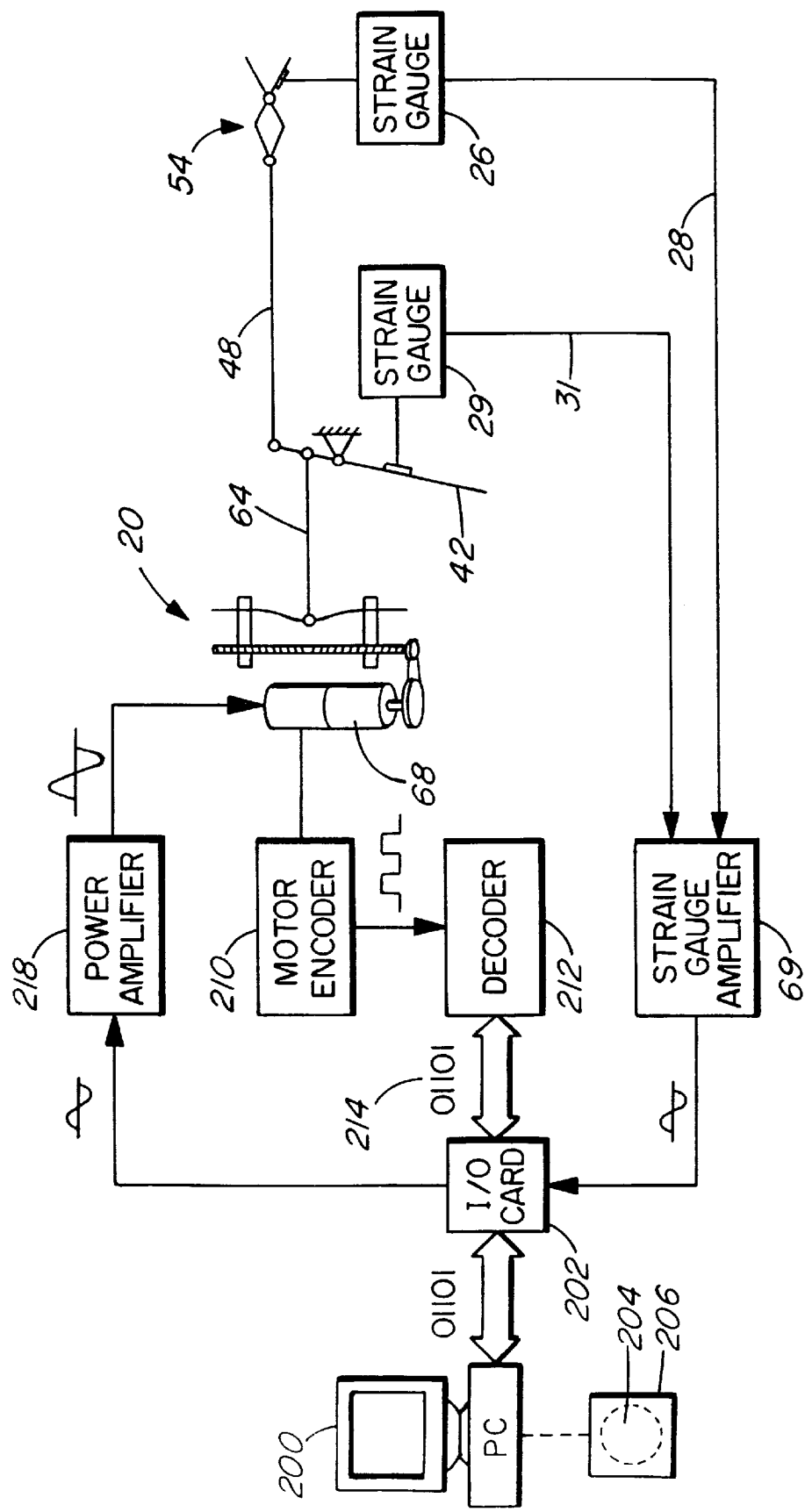

Controller 30 may be implemented in software in a programmable controller or a computer equipped with suitable input and output interfaces or in suitable hardware. FIG. 7 shows a block diagram of a system according to the invention which uses a computer to control the spring constant of a tunable spring. A commercial embodiment of the invention could differ from the embodiment of FIG. 7 in various obvious respects.

In the prototype embodiment of FIG. 7, signals 28 and 31 are provided to a computer 200 by way of an amplifier 69 and an I/O card 202. Signals 28 and 31 are preferably conditioned by passing them through a low pass filter which may be included in amplifier 69. The low pass filter may, for example, have a cutoff frequency of about 10 Hz. Software 204 in a memory device 206 runs on computer 200. Software 204 also receives a signal 214 which represents the current state of tunable spring 20. Signal 214 may, for example, be provided to computer 200 from a motor encoder coupled to motor 68 through a decoder 212 and I/O card 202. Software 204 then operates motor 68 as necessary to control tunable spring 20 by providing an output signal at I/O card 202 which is amplified by a power amplifier 218 (which may be, for example only, a pulse width modulation servo amplifier) and applied to drive motor 68.

It can be appreciated that the haptic control system of the invention decouples the transmission of force from the motion of a remote manipulator. This permits a designer to simultaneously provide a variable transmission ratio and limit the maximum force output of the remote manipulator. Many variations are possible in the design of a system according to the invention.

While the invention has been described primarily with reference to a grasper of the type commonly used in surgery, remote manipulators of other types may also be made according to the invention. While the invention has particular advantages for use with remote manipulators of the type where an object O is grasped between a pair of members the invention may also be applied to other types of remote manipulator. For example, the remote manipulator could be of a type which simply pushes on an object O.

While the embodiment of FIG. 2 uses an operating lever 42 as an operating member 12, other types of operating member could be used. The invention could be used, for example, in a situation where the operating member 12 comprises a movable push button which can be pressed against a resistance of a tunable spring 20.

Where the operating member is a lever, tunable spring 20 need not be coupled to the lever in the identical manner shown in FIGS. 2 and 4. Tunable spring 20 could couple to an operating lever, such as lever 42 on either side of pivot pin 46. Tunable spring 20 could be on either side of handle 44. While tunable spring 20 is shown as being coupled to lever 42 with a single link, which is preferred, the linkage coupling tunable spring 20 could be replaced with some other design of mechanical linkage. All that is necessary for broader implementations of the invention is that tunable spring 20 be coupled to operating lever 42 so that an operator moves lever 42 against a force generated by deflection of tunable spring 42.

Figure 6A:
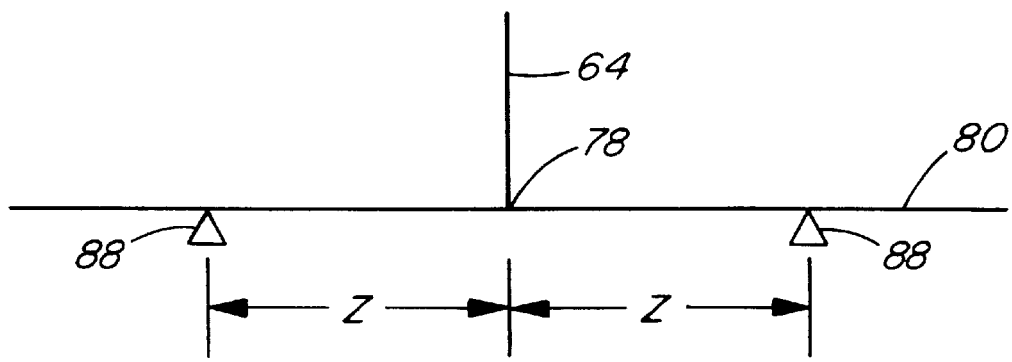
FIGS. 6A and 6B are schematic views of two alternative forms of leaf spring which may be used with the invention; and, FIG. 7 is a schematic block diagram illustrating a prototype system according to the invention which uses a computer to control the stiffness of a tunable spring.
Figure 6B:
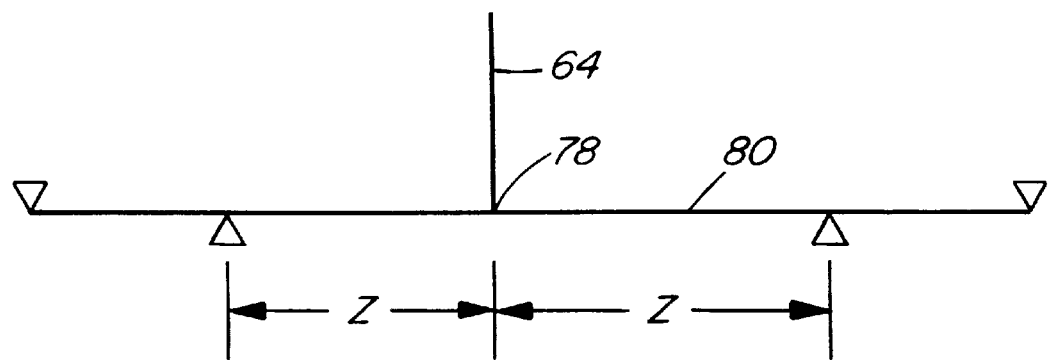

The tunable spring 20 need not be of the type shown in FIG. 3 (although the tunable spring of FIG. 3 has advantages which make it particularly well suited for use with the invention). FIGS. 6A and 6B show, for example, two alternative tunable springs which may be used to practice the invention. The tunable spring of FIG. 6A has a leaf 80 which is supported by two guides 88 which are spaced equally on either side of a midpoint 78 of leaf 80 by a distance Z.

The tunable spring of FIG. 6B is the same as the spring of FIG. 6A except that the endpoints of leaf 80 are held against transverse movement by guides 88'.

The tunable spring of FIG. 3 is preferable to those shown in FIGS. 6A and 6B because, for a given length of leaf 80 it produces the greatest range of stiffnesses and also has the lowest maximum bending moment for a given deflection of the spring. A tunable spring 20 does not necessarily need to have a leaf which is supported on both sides of its midpoint. Tunable springs in which one end of the spring is coupled to an operating member 12 could also be used.

In a tunable spring 20 of the type shown in any of FIGS. 2, 6A and 6B, various mechanisms may be provided to adjust the separation of supports 82 and 83. The invention is not limited to the use of a threaded rod 86, as shown.

Tunable springs of types other than tunable leaf springs could also be used in the invention. All that is necessary in the tunable spring is that it have physical dimensions compatible with the intended application, and that it have a variable spring constant capable of being controlled by a controller 30. In general, the tunable spring should have several attributes. The tunable spring should have a spring constant which is variable over a sufficiently large range that when the tunable spring is at its lowest stiffness setting the tunable spring presents minimal resistance to movement of the operating member and when the tunable spring is at its highest stiffness setting a large force must be applied to move the operating member against the force of the tunable spring. Preferably, when the tunable spring is at its stiffest setting the operating member feels nearly rigid. For example, in some applications it is desirable that the operating member exhibit a stiffness on the order of about 100 Newtons/mm when the tunable spring is at its stiffest setting.

The tunable spring should not exhibit plastic deformation even under the largest forces which are reasonably likely to be applied to the tunable spring under its normal operating conditions.

The action of changing the spring constant of the tunable spring should not, in itself, move the operating member. The force generated by the tunable spring should be a product of the spring constant and a displacement which depends on the position of the operating member.

The linkage 16 between operating member 12 and manipulator member 14 is not necessarily a mechanical linkage. The invention could be used in situations where linkage 16 includes a wired or wireless electrical remote control.

While controller 30 has been described as using signal 31 which represents $F_{IN}$ as the basis for controlling tunable spring 20 it could be possible, in the alternative, to use $F_{OUT}$ for this purpose. However, using $F_{OUT}$ may result in control instabilities due to the fact that the linkage between the operating member and the manipulator member(s) will typically have some friction and backlash. Only one of sensors 26 and 29 is necessary to practise the invention although it is preferred to provide both sensors 26 and 29.

In addition to one or more force sensors, a displacement sensor could be provided to measure, directly or indirectly, the displacement of the manipulator member(s). The measured displacement could be used to compute, in real time, the stiffness of the environment or object against which the manipulator member is bearing. This computed value for the stiffness of the environment may be used in place of a constant value for $C_0$ in order to improve the operation of controller 30.

As will be apparent to those skilled in the art in the light of the foregoing disclosure, many other alterations and modifications are possible in the practice of this invention without departing from the spirit or scope thereof. Accordingly, the scope of the invention is to be construed in accordance with the substance defined by the following claims.

We claim:

1. A remote manipulator comprising:
   a) a manipulable operating member pivotally movable about a pivot axis;
   b) a manipulator member coupled to the operating member by a linkage, the linkage causing the manipulator member to move in response to movements of the operating member;
   c) a tunable spring having a variable spring constant, the tunable spring coupled between a connection point spaced apart from the pivot axis on the manipulator member and a mount;
   d) a force sensor coupled to the operating member, the force sensor producing a signal representing a force applied to the operating member; and,
   e) a control circuit connected to receive the signal and to vary the spring constant of the tunable spring in response to the signal.

2. The remote manipulator of claim 1 wherein the tunable spring comprises a leaf spring.

3. The remote manipulator of claim 2 wherein the leaf spring comprises a resilient leaf coupled to the operating member.

4. The remote manipulator of claim 3 wherein the tunable spring comprises a pair of spaced apart supports separated by an adjustable separation distance, the supports bearing against at least one side of the resilient leaf the spring constant of the spring variable by changing the separation distance.

5. The remote manipulator of claim 4 comprising an adjustment screw threadedly engaging each of the supports and a motor connected to turn the adjustment screw in response to signals from the controller, the separation distance adjustable by rotating the adjustment screw.

6. The remote manipulator of claim 3 wherein the leaf spring comprises a first pair of supports on a first side of the resilient leaf, the first supports respectively located at first and second ends of the leaf and a second pair of supports on a second side of the leaf, the second supports arranged symmetrically on either side of a center point of the resilient leaf wherein the spring constant is variable by adjusting the separation distance of the support members.

7. The remote manipulator of claim 3 wherein the leaf spring comprises a pair of support members spaced apart by a separation distance and arranged symmetrically on either side of a center point of the resilient leaf wherein the spring constant is variable by adjusting the separation distance of the support members.

8. The remote manipulator of claim 3 comprising a pair of supports spaced apart by a separation distance and arranged symmetrically, one support on either side of a center point of the resilient leaf, each support comprising members bearing against first and second surfaces of the resilient leaf to maintain a deflection of the resilient leaf and a derivative of the deflection fixed in the portions of the resilient leaf supported by the supports, wherein the spring constant is variable by adjusting the separation distance of the supports.

9. The remote manipulator of claim 1 wherein the remote manipulator comprises a laparoscopic grasper and the operating member is a movable handle of the grasper.

10. The remote manipulator of claim 9 wherein the resilient leaf comprises a leaf of Beryllium-Copper.

11. The remote manipulator of claim 1 wherein the controller comprises:
   a) means for comparing the force sensor signal to a threshold value; and,
   b) means for increasing the spring constant of the spring if the force sensor signal exceeds the threshold value.

12. The remote manipulator of claim 11 wherein the controller controls the actuator so that an output force $F_{OUT}$ on the manipulator member is equal to a desired value $F_{DESIRED}$ which is given by:

$$F_{DESIRED} = \begin{Bmatrix} r'F_{IN} & \text{if: } r'F_{IN} \leq F_{LIM} \\ F_{LIM} & \text{if: } r'F_{IN} > F_{LIM} \end{Bmatrix} \quad (7)$$

where $F_{LIM}$ is a maximum value desired for $F_{OUT}$ and r' is a desired force transmission function from the operating member to the manipulator member.

13. The manipulator of claim 11 comprising a displacement sensor coupled to the manipulator member, the displacement sensor providing a displacement signal to the controller, the controller computing from the displacement signal a compliance of an environment of the manipulator member and using the compliance in controlling the spring constant.

14. The remote manipulator of claim 1 comprising an output force sensor coupled to the manipulator member, the output force sensor providing to the controller an output force signal representing a force applied to the manipulator member.

15. A remote manipulator comprising:
   a) an operating member, the operating member movable against a force of a tunable spring coupled to the operating member, the tunable spring having a variable spring constant;
   b) a manipulator member;
   c) a linkage coupling the operating member and the manipulator member, the linkage causing the manipulator member to move in response to motion of the operating member;
   d) a sensor coupled to detect and generate a signal representing a force applied to the operating member;
   e) a controller connected to receive the signal; and,
   f) an actuator operable by the controller to vary the spring constant.

* * * * *